RADIO FREQUENCY SHIELDING AND SEALING MATERIAL

Original Filed Jan. 28, 1963

James H. McAdams,
INVENTOR.
Harry M. Saragovitz
BY Edward J. Kelly
Herbert Berl
Alfred E. Smith
ATTORNEYS United States Patent Office 3,230,294
Patented Jan. 18, 1966

3,230,294

RADIO FREQUENCY SHIELDING AND SEALING MATERIAL

James H. McAdams, Huntsville, Ala., assignor to the United States of America as represented by the Secretary of the Army Original application Jan. 28, 1963, Ser. No. 254,517. Divided and this application Dec. 2, 1964, Ser. No. 415,549
6 Claims. (Cl. 174—35)
(Granted under Title 35, U.S. Code (1952), sec. 266)

The invention described herein may be manufactured and used by or for the Government for governmental purposes without the payment of any royalty thereon.

This application is a division of application Serial Number 254,517 filed January 28, 1963, and now abandoned.

This invention relates generally to shielding aid sealing material and more particularly, to a radio frequency barrier material.

Presently available electromagnetic and electrostatic shielding structures having covered apertures are required to have a shielding and sealing gasket interposed between the structure and the cover. This gasket is required to reduce the transfer of electromagnetic or electrostatic energy from the volume contained within the structure to the volume surrounding the structure. Also, the gasket should provide a seal against moisture, dust, etc. These commercially available shielding and sealing materials have not demonstrated acceptance in solving shielding problems.

It is, therefore, an object of this invention to provide a novel radio frequency barrier material that is efficient for barring energy transfer of electrical energy from the low frequency region to the microwave region.

It is another object of this invention to provide a barrier material that can be removed and replaced without soldering, welding, or bolting.

A further object of this invention is to provide a barrier material that is environment resistant.

A still further object of this invention is to provide a barrier material which may be compressed sufficiently to permit irregularities or non-aligned surfaces in an inclosure's frame and cover, without degradation of the barrier efficiency.

The foregoing and other objects of this invention will become more fully apparent from the following detailed description and from the accompanying drawings, in which:

FIGURE 1 illustrates a preferred embodiment of the invention in different stages of completion;

FIGURE 1*a* is a sectional view, partly broken away, of the embodiment of FIGURE 1 disposed between an inclosure and its cover.

According to the present invention, a body of resilient material is used to encapsulate an electrically conducting member. The conducting member provides multiple parallel electrical paths between the shielding enclosure and its cover and thus forms myriad interlocking magnetic fields. These magnetic fields provide a volume of eddy currents which inherently assume electrical phase relationships that cancel or reduce transfer of magnetic forces by reflection or re-radiation. To enhance the performance of the barrier material, especially at frequencies approaching the microwave region, the resilient material is impregnated with electrically conductive particles.

Figure 1:
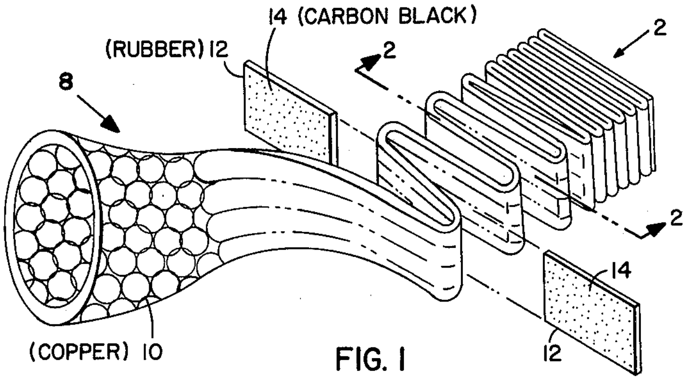
Figure 2:
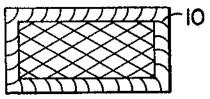
FIGURE 2 is a sectional view along the plane 2—2 of FIGURE 1.

A preferred embodiment of the invention is illustrated in FIGURE 1 and comprises a barrier material 2 formed by flattening a knit tube 8 of conducting wires 10 and forcing said tube into a strip having serpentine convolutions. This conductor is encapsulated by placing inserts 12 between the convolutions and applying pressure to the assembly to bond adjacent convolutions or where necessary by cementing adjacent inserts. It is noted that conductors 10 are fabricated perpendicular to the length of the tube and the conductors are electrically in a plane normally perpendicular to the plane of the contacting surfaces of a shielding enclosure 11 and its cover 13 (see FIGURE 12).

Conductors 10 may be any highly conductive material such as copper, beryllium copper or silver, and have a length equal to the thickness of the finished assembly. Where copper or similar material is used it may be desirable to plate the conductor with a suitable noble metal to enhance its conductivity and reduce susceptance to corrosion.

The encapsulating material may be any rubberlike material that is resilient, resistant to chemicals and organics, heat, cold and other environmental conditions. A preferred, although not required, encapsulating material is silicone rubber. Additionally, the encapsulating material contains uniformly distributed particles 14 (shown in FIGURE 1), such as carbon black, graphite or similar particles for improving the conductive and magnetic properties of the material.

Particles 14 cause the encapsulating material to possess electrical conductivity and improve the performance of the barrier, especially at radio frequencies approaching the microwave region.

Figure 3:
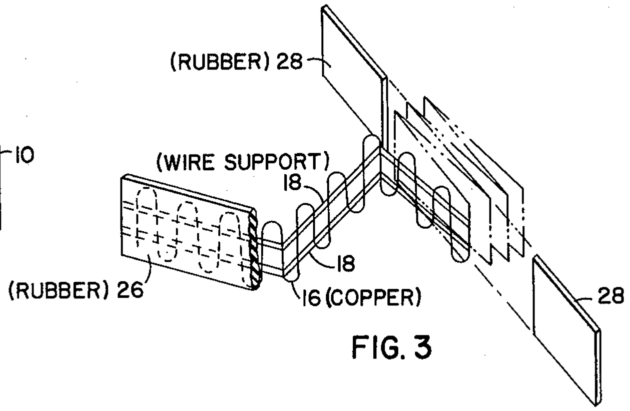
FIGURE 3 illustrates an additional embodiment of the invention.

An embodiment of the invention utilizing a screen form of conducting rod 16 is shown in FIGURE 3. The conducting rod is formed in a serpentine with the convolutions perpendicular to the length. Support members 18 are secured to the serpentine, parallel to its length, for providing a rigid structure. The support members are preferably formed of coarse material, which may be conductive or non-conductive, having a diameter which may be larger than that of the conducting rod. The support members are secured to the serpentine by crimping, indenting, welding, or other means to provide mechanical strength to the structure. The serpentine form is then encapsulated in plastic material 26 and bent to form a second serpentine configuration having its convolutions perpendicular to those of the first serpentine. As a final step in forming the barrier material, the adjacent portions of the encapsulated conductor are bonded together by compression, cementing or any other suitable techniques well known in the art. An alternate method of encapsulating this embodiment is to use inserts 28 as was done with the knit tube embodiment.

Figure 4:
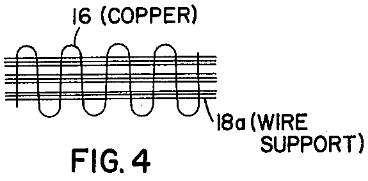
FIGURE 4 is a plan view of a modification of the embodiment shown in FIGURE 3.
Figure 5:
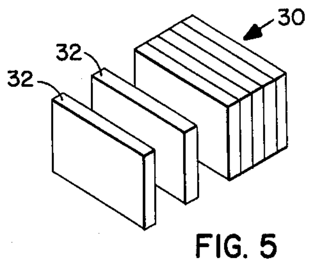
FIGURE 5 illustrates the final form of the embodiments shown in FIGURES 1, 3 and 4.
Figure 1A:
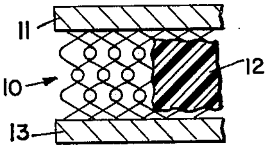

A modification of the screen form conductor is shown in FIGURE 4 and is similar to that of FIGURE 3, however, instead of a pair of support members 18 it utilizes a number of support members, each having plural strands of wire 18*a*. Also the second serpentine is formed so that the support members extend parallel to the troughs of the second serpentine.

The manner in which the conductors, of each embodiment, are encapsulated and bonded is not limited to compression techniques. Cementing, pre or post curing, injection and other techniques are also appropriate.

In the application of the screen material, where bent ends are employed, and in the application of the knit tubing, it is possible and practical to permit the protruding portions of the conducting material to extend beyond the encapsulating material. These protruding portions are bent to the surface of the encapsulating material and become matted or sueded.

Additionally, the finished assembly 30 in any of the forms described above may be cut or sliced into sections 32 of an appropriate size whereupon the conducting material may be flush with the surface of the encapsulating material.

Other variations in the specific structure illustrated and in the component materials mentioned, by way of example, will now be apparent to those skilled in the art and may be made without departing from the spirit and scope of the invention as set forth in the appended claims.

I claim:

1. A radio frequency barrier material for insertion between facing surfaces of an enclosure and a cover member for preventing the transfer of radio frequency energy from one area to another, said material comprising:

(a) an electrically conducting member providing a multiplicity of parallel electrical paths perpendicular to the facing surfaces of said shielding enclosure and said cover; and said conducting member having a first serpentine configuration with convolutions extending transversely of the longitudinal axis of said member and said member being bent to form a second serpentine configuration having convolutions perpendicular to the convolutions of said first serpentine configuration;

(b) a resilient material encapsulating said conducting member for providing a seal between the shielding enclosure and its cover.

2. A radio frequency barrier material for insertion between facing surfaces of an enclosure and a cover member for preventing the transfer of radio frequency energy from one area to another, said material comprising:

(a) an electrically conducting member in the form of a flattened tube of knitted copper wire bent to have the shape of a compressed serpentine, said tube being flattened in a plane parallel to the length thereof and the convolutions of said serpentine being formed transverse to the longitudinal axis of said tube; and (b) a resilient material encapsulating said conducting member for providing a seal between the shielding enclosure and its cover.

3. A radio frequency barrier material for insertion between facing surfaces of an enclosure and a cover member for preventing the transfer of radio frequency energy from one area to another, said material comprising:

(a) an electrically conducting rod having a serpentine configuration;

(b) a resilient material encapsulating said rod; and (c) said encapsulated rod being bent to form a second serpentine configuration having convolutions perpendicular to the convolutions of said first serpentine configuration with the convolutions of said second serpentine being in contact with one another.

4. A radio frequency barrier material as set forth in claim 3 further including a plurality of supporting members secured to said serpentine and extending along the length of said serpentine.

5. A radio frequency barrier material as set forth in claim 4 wherein said support members each include a plurality of fine wires extending parallel to the troughs of said second serpentine.

6. A radio frequency barrier material as set forth in claim 1, further including electrically conductive particles distributed throughout said encapsulating material.

References Cited by the Examiner

UNITED STATES PATENTS

| | | | |
|---|---|---|---|
| 2,674,644 | 4/1954 | Goodloe | 174—35 |
| 3,019,281 | 1/1962 | Hartwell | 174—35 |
| 3,140,342 | 7/1964 | Ehrreich et al. | 174—35 |

BERNARD A. GILHEANY, *Primary Examiner.*

DARRELL L. CLAY, *Examiner.*